United States Patent [19]

Sejpka et al.

[11] Patent Number: 5,705,592
[45] Date of Patent: Jan. 6, 1998

[54] FLUOROSILOXANE-CONTAINING CARE COMPOSITIONS

[75] Inventors: Johann Sejpka, Tannenweg; Franz Wimmer, Asternweg, both of Germany

[73] Assignee: Wacker-Chemie GmbH, Munich, Germany

[21] Appl. No.: 727,065

[22] Filed: Oct. 8, 1996

[30] Foreign Application Priority Data

Oct. 26, 1995 [DE] Germany ............ 19539940.4

[51] Int. Cl.$^6$ ........................ C08G 77/24
[52] U.S. Cl. ............ 528/42; 528/15; 427/387; 524/837; 524/588
[58] Field of Search ............ 528/15, 42; 427/387; 524/837, 588

[56] References Cited

U.S. PATENT DOCUMENTS

| | | | |
|---|---|---|---|
| 2,842,521 | 7/1958 | Nitzsche et al. | 260/46.5 |
| 3,668,180 | 6/1972 | Brennan et al. | 260/46.5 |
| 3,792,071 | 2/1974 | Nitzsche et al. | 260/448.8 |
| 3,846,358 | 11/1974 | Roedel | 260/18 |
| 4,298,753 | 11/1981 | Schinabeck et al. | 556/415 |
| 4,757,106 | 7/1988 | Mayer | 524/262 |
| 5,261,951 | 11/1993 | Sejpka et al. | 106/3 |
| 5,473,038 | 12/1995 | O'Lenick, Jr. | 528/42 |

FOREIGN PATENT DOCUMENTS

| | | |
|---|---|---|
| 0110370 | 6/1984 | European Pat. Off. . |
| 0548789 | 6/1993 | European Pat. Off. . |
| 548789 | 6/1993 | European Pat. Off. . |
| 657487 | 6/1995 | European Pat. Off. . |
| 1475709 | 4/1967 | France . |
| 3613384 | 1/1988 | Germany . |
| 3635093 | 3/1988 | Germany . |
| 4231184 | 3/1994 | Germany . |
| 3227383 | 10/1991 | Japan . |
| 4-202389 | 7/1992 | Japan . |
| 4202389 | 7/1992 | Japan . |
| 0685173 | 12/1952 | United Kingdom . |

OTHER PUBLICATIONS

Derwent Abstract Corresponding to JP 4–202385 (# 92-295553/36).

Derwent Abstract Corresponding to DE 4231184 (# 94-102289/13).

*Primary Examiner*—Melvyn I. Marquis
*Attorney, Agent, or Firm*—Martin Connaughton

[57] ABSTRACT

Care compositions for hard surfaces, which can be prepared using organopolysiloxanes which are solid at room temperature, contain fluorine groups and can change their state of aggregation reversibly on the basis of changes in temperature.

13 Claims, No Drawings

FLUOROSILOXANE-CONTAINING CARE COMPOSITIONS

FIELD OF INVENTION

The present invention relates to aqueous care compositions comprising fluoro-organopolysiloxanes for hard surfaces.

BACKGROUND OF INVENTION

Care compositions based on fluoro-organopolysiloxanes for hard surfaces, for example for automobile bodies, are already known. Reference is made to JP-A-04202389, which describes a care composition which is obtained by a procedure in which a fluorinated organopolysiloxane, which is synthesized by reacting a methyltrifluoropropylsiloxane containing hydroxyl groups, which have a fluorine content of 0.1% to 26.5% by weight, with a dimethylsiloxane which is crosslinked with a silicone alkoxide, and a wax or wax-like substance are dispersed in water. The fluorinated organopolysiloxane is a solid branched silicone rubber, the physical state of which is no longer reversible.

JP-A-03227383 describes a care composition which comprises a trimethylsilyl-capped polymethyl(trifluoro-propyl) siloxane and waxes, such as carnauba wax 12, Hoechst wax PE 1303 and MINK 5, and an aliphatic solvent. The fluorinated organopolysiloxane is a liquid siloxane which can easily be washed out or re-emulsified.

EP-A-0548789 describes care compositions, for hard surfaces, which contains no organic solvent and are prepared using organopolysiloxanes which are solid at room temperature.

DE-C-3635093 describes the preparation of fluorine-containing siloxanes by reaction of alcohols containing fluorine groups with siloxanes containing Si-H. However, the products thus prepared have the disadvantage that, because of the newly formed Si-O-C linkage, they react in an aqueous system by hydrolysis to give silanols which then polymerize by condensation. The alcohol employed, which contains fluorine groups, is obtained again as a further cleavage product. Furthermore, this specification mentions the preparation of products containing fluorine groups by reaction of SiH components with corresponding olefins containing fluorine groups as prior art.

The known fluorine-containing organopolysiloxanes can be washed out by water or re-emulsified if they are liquid, and if they are crosslinked in the form of a silicone rubber, they can no longer change their physical state, so that they can be applied only with difficulty, since they cannot be liquefied again by the heat of friction which arises during application. Moreover, they sometimes contain organic solvents which are undesirable because of their toxicological properties and their fire risk.

There was therefore the object of providing care compositions which are based on organopolysiloxanes where the compositions are essentially free from organic solvents and can change their physical state reversibly. The care compositions show good hydrophobization and good oleophobization.

SUMMARY OF INVENTION

The present invention relates to care compositions for hard surfaces, which can be prepared using organopolysiloxanes which are solid at room temperature and contain fluorine groups, and which can change their physical state reversibly on the basis of changes in temperature.

In the present invention, the reversible change in the state of aggregation means that the solid state of aggregation changes reversibly into the liquid state.

The aqueous care compositions according to the invention preferably contain no organic solvent. However, they can contain small amounts of not more than 2% by weight, based on the total weight of the care composition, of an organic solvent, that functions as a preservative.

Room temperature in the following is a temperature of 20° C.

The organopolysiloxanes which are solid at room temperature, contain fluorine groups and are employed according to the invention are those with units of the formula

(I)

in which

R is an identical or different monovalent hydrocarbon radical or hydrocarbon radical containing fluorine groups, $R^1$ is an identical or different hydrocarbon radical containing fluorine groups, a is 0, 1, 2 or 3, on average 0.75 to 1.5, preferably 0.9 to 1.1, and b is 0, 1, 2 or 3, on average 0.0 to 1.1, preferably 0.01 to 0.07, with the proviso that the sum of a+b is less than or equal to 3 and at least one unit which contains a hydrocarbon radical containing fluorine groups is present in the total molecule.

Preference is given to linear organopolysiloxanes which are solid at room temperature and contain fluorine groups, of the formula

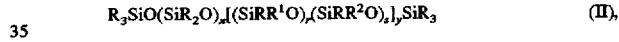
(II), in which

R and $R^1$ have the meaning given above for these radicals and $R^2$ is an identical or different monovalent hydrocarbon radical and r has a value from 0 to 100, preferably from 0.1 to 20, more preferably from 0.5 to 10, s has a value from 0 to 179, preferably from 10 to 120, more preferably from 40 to 90, x has a value from 0 to 300, preferably from 10 to 180, more preferably from 20 to 80, y has a value from 1 to 180, preferably from 5 to 120, more preferably from 10 to 80, and the sum of x+y is 1-300, preferably 200, and more preferably 100, with the proviso that at least one radical R in formula (II) has the meaning of a hydrocarbon radical having at least 18 carbon atoms and where r=0, at least one radical has the meaning of $R^1$.

The radical R is hydrocarbon radicals having 1 to 24 carbon atom(s).

Examples of radicals R are alkyl radicals, such as the methyl, ethyl, n-propyl isopropyl, n-butyl isobutyl, tert-butyl n-pentyl, isopentyl, neopentyl and tert-pentyl radical hexyl radicals, such as the n-hexyl radical, heptyl radicals, such as the n-heptyl radical octyl radicals, such as the n-octyl radical and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical, octadecyl radicals, such as the n-octadecyl radical, and the n-eicosyl radical; alkenyl radicals, such as the vinyl and the allyl radicals; cycloalkyl radicals, such as cyclopentyl cyclohexyl and cycloheptyl radicals and methylcyclohexyl radicals; aryl radicals, such as the phenyl, naphthyl and anthryl and phenanthryl radical; alkaryl radicals, such as o-, m-, and p-tolyl radicals, xylyl radicals and ethylphenyl radicals; and aralkyl radicals, such as the benzyl radical and the α- and the β-phenylethyl radical.

R is preferably the methyl radical and the n-octadecyl radical.

Examples of radicals R substituted by fluorine groups are preferably the substituents mentioned for $R^1$.

The radical $R^1$ is an alkylene-$R_F$ radical, wherein the alkylene radical is the ethylene or propylene radical.

$R_F$ is a linear or branched, perfluorinated radical having 1 to 12 carbon atoms.

Examples of the radical $R_F$ are trifluoromethyl or perfluorohexyl radical and the like.

The radical $R^2$ is hydrocarbon radicals having 1 to 18 carbon atom(s), the methyl radical being preferred.

Examples of radicals $R^2$ are alkyl radicals, such as methyl, ethyl, n-propyl, isopropyl, n-butyl, isobutyl, tert-butyl, n-pentyl, isopentyl, neopentyl or tert-pentyl radical hexyl radicals, such as the n-hexyl radical, heptyl radicals, such as the n-heptyl radical, octyl radicals, such as the n-octyl radical and iso-octyl radicals, such as the 2,2,4-trimethylpentyl radical, nonyl radicals, such as the n-nonyl radical, decyl radicals, such as the n-decyl radical and dodecyl radicals, such as the n-dodecyl radical; alkenyl radicals such as the vinyl and the allyl radical; cycloalkyl radicals, such as cyclopentyl, cyclohexyl and cycloheptyl radicals and methylcyclohexyl radicals; aryl radicals, such as the phenyl, naphthyl and anthryl and phenanthryl radical; alkaryl radicals, such as o-, m- or p-tolyl radicals, xylyl radicals and ethylphenyl radicals; and aralkyl radicals, such as the benzyl radical and the α- and the β-phenylethyl radical.

Although not shown in the above formula, up to 10 mol % of the diorganosiloxane units can be replaced by other siloxane units, which are usually present, however, only as impurities which are more or less difficult to avoid, such as $R_3SiO_{1/2}$, $RSiO_{3/2}$ or $SiO_{4/2}$ units, in which R has the meaning given above for this radical.

The organopolysiloxanes which are solid at room temperature are prepared by processes analogous to those described, for example, in GB 6 85 173 A (published on Dec. 31, 1951, Dow Corning Ltd), U.S. Pat. No. 2,842,521 (issued on Jul. 8, 1958, Wacker-Chemie GmbH), FR 14 75 709 A (published on Apr. 7, 1967, General Electric Co.), U.S. Pat. No. 3,668,180 (issued on Jun. 6, 1972, Stauffer-Wacker-Silicone Corp.), U.S. Pat. No. 3,792,071 (issued on Feb. 12, 1974, Wacker-Chemie GmbH), U.S. Pat. No. 3,846,358 (issued on Nov. 5, 1974, General Electric Co.), and U.S. Pat. No. 4,298,753 (issued on Nov. 3, 1981, Wacker-Chemie GmbH). In the processes described therein, the product containing fluorine groups is added on to the H-siloxane in the first step and the unsaturated olefin is added in the second step.

The polysiloxane according to the invention, which contains fluorine groups, is prepared by using an H-siloxane with units of the formula

$$H_aSiR^3{}_bO_{4-a-b/2} \qquad (III)$$

in which $R^3$ is identical or different monovalent, optionally halogen-substituted $C_1$–$C_{15}$-hydrocarbon or hydrocarbonoxy radicals or hydroxyl groups, a is 0, 1, 2 or 3, on average 0.01 to 1.2, preferably 0.1 to 1, and b is 0, 1, 2 or 3, on average 1.0 to 2.0, preferably 1.4 to 1.8, with the proviso that at least one Si-bonded hydrogen atom is present per molecule.

Examples of the $C_1$–$C_{15}$-hydrocarbon radicals are alkyl radicals, such as the methyl, ethyl, n-propyl, isopropyl n-butyl, isobutyl, tert-butyl, n-pentyl, isopentyl, neopentyl and tert-pentyl radicals; hexyl radicals, such as the n-hexyl radical; heptyl radicals, such as the n-heptyl radicals; octyl radicals, such as the n-octyl radical and iso-octyl radicals, such as the 2,2,4-trimethylpentyl radicals; nonyl radicals, such as the n-nonyl radical; decyl radicals, such as the n-decyl radical; dodecyl radicals, such as the n-dodecyl radical; alkenyl radicals, such as the vinyl and the allyl radicals; cycloalkyl radicals, such as cyclopentyl, cyclohexyl and cycloheptyl radicals and methylcyclohexyl radicals; aryl radicals, such as the phenyl, naphthyl, antryl and phenanthryl radicals; alkaryl radicals, such as o; m-, and p-tolyl radicals, xylyl radicals and ethylphenyl radicals; and aralkyl radicals, such as the benzyl radical and the α- and the β-phenylethyl radical.

Examples of halogen-substituted $C_1$–$C_{15}$-hydrocarbon radicals are alkyl radicals substituted by fluorine, chlorine, bromine and iodine atoms, such as the 3,3,3-trifluoro-n-propyl radical the 2,2,2,2',2',2'-hexafluoroisopropyl radical and the heptafluoroisopropyl radical, and haloaryl radicals, such as the o-, m - and p-chlorophenyl radical.

The unsubstituted $C_1$–$C_6$-alkyl radicals, in particular the methyl radical, and the phenyl radical are preferred.

Examples of the $C_1$–$C_{15}$-hydrocarbonoxy radicals are the above $C_1$–$C_{15}$-hydrocarbon radicals which are bonded to the silicon atom via a divalent oxygen atom. Not more than 5%, preferably none, of the radicals $R^3$ are hydrocarbonoxy radicals or hydroxyl groups. A more preferred H-siloxane is methylhydridopolysiloxane terminated by trimethylsilyl.

The H-siloxanes have a viscosity of not more than 300 $mm^2/s$, preferably of 5 to 100 $mm^2/s$, more preferably of 15–25 $mm^2/s$, at 25° C. Linear H-siloxanes are preferred. The hydrogen content is 0.05% to 5.0% by weight.

The H-siloxane is employed in amounts of 5% to 25% by weight, preferably in amounts of 10% to 20% by weight, and more preferably in amounts of 15% to 18% by weight. The H-siloxane is heated to a temperature of 80° to 120° C. in an organic solvent, such as toluene or xylene, while gassing with an inert gas, preferably nitrogen.

An olefin containing a fluorine group, such as trifluoropropene, perfluorohexylethylene or tetrafluoroethyl allyl ether, is added to this mixture, perfluorohexylethylene being preferred.

The olefin containing a fluorine group is preferably used in amounts of 0.1% to 80% by weight, preferably in amounts of 1% to 60% by weight, and more preferably in amounts of 5% to 40% by weight.

Platinum metals and/or compounds thereof, preferably platinum and/or compounds thereof, are employed. All the catalysts which have been employed to date for addition of hydrogen atoms bonded directly to Si atoms on to aliphatically unsaturated compounds can be employed. Examples of such catalysts are metallic and finely divided platinum, which can be on supports, such as silicon dioxide, aluminum oxide or active charcoal, and compounds or complexes of platinum, such as platinum halides, for example $PtCl_4$, $H_2PtCl_6.6H_2O$ or $Na_2PtCl_4.4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6.6H_2O$ and cyclohexanone, platinum-vinylsiloxane complexes, in particular platinumdivinyltetramethyldisiloxane complexes with or without a content of detectable inorganically bonded halogen, bis-(gamma-picoline)-platinum dichloride, trimethylene-dipyridineplatinum dichloride, dicyclopentadiene-platinum dichloride, dimethylsulfoxide-ethylene-platinum(II) dichloride and reaction products of platinum tetrachloride with an olefin and primary amine or secondary amine or primary and secondary amine, such as the reaction product of platinum tetrachloride, dissolved in 1-octene, with sec-butylamine, or ammonium-platinum complexes according to EP-B 110 370.

The platinum catalyst is employed in amounts of 0.5 to 500 ppm by weight (parts by weight per million parts by weight), in particular 2 to 400 ppm by weight, in each case calculated as elemental platinum and based on the total weight of the H-siloxanes present in the compositions.

The olefin containing fluorine groups and the platinum catalyst are added in a period of 30 minutes and stirred at a temperature of 120° C. for a period of 2 hours.

In a second step, an alkylene, such as n-octadecene and n-eicosene, is added to this mixture. This alkylene is employed in amounts of 10% to 80% by weight, preferably in amounts of 20% to 70% by weight, and more preferably in amounts of 30% to 60% by weight.

This mixture is added in a period of 30 minutes to 120 minutes, and the mixture is then stirred at a temperature of 100° to 140° C. over a period of 30 minutes to 120 minutes. Finally, an alkylene having 6 to 10 carbon atoms, preferably n-octene, is added in amounts of 0% to 20% by weight, preferably in amounts of 1% to 15% by weight, and more preferably in amounts of 5% to 10% by weight, and the mixture is stirred at a temperature of 100° to 140° C. for 30 to 120 minutes. The mixture is distilled at a temperature of 120° to 150° C., the end product being obtained in an amount of 85% to 99% by weight of the calculated theoretical yield.

The organopolysiloxanes which are solid at room temperature and comprise units of formula (I) are organopolysiloxanes of $(RSiO_{3/2})$-units and organopolysiloxanes of $(R_3SiO_{1/2})$ and $(SiO_{4/2})$ units, where R has the above-mentioned meaning.

Preferably 10% to 50%, more preferably 25% to 50%, in particular 35% to 50%, of the number of radicals R in the organopolysiloxane of formula (II) are hydrocarbon radicals having at least 18 carbon atoms. Because of easier accessibility, the other radicals are preferably methyl radicals.

Examples of the organopolysiloxanes of formula II which are solid at room temperature and are employed according to the invention are $Me_3SiO[MeSi(n-C_{18}H_{37})O]_m[MeSi(CH_2CH_2(CF_2)_5CF_3)O]_nSiMe_3$, in which m is an integer from 10 to 150, preferably from 20 to 120, more preferably from 40 to 90, and n is an integer from 0 to 30, preferably from 0 to 20, more preferably from 1 to 12, a ratio of m to n of 30:1 to 1:1 being preferred, and a ratio of 19:1 to 4:1 being more preferred.

The organopolysiloxanes of formula (II) which contain fluorine groups and are solid at room temperature are preferably B: $Me_3SiO[MeSi(n-C_{18}H_{37})O]_{57}[MeSi(CH_2CH_2(CF_2)_5CF_3)O]_3SiMe_3$ C: $Me_3SiO[MeSi(n-C_{18}H_{37})O]_{54}[MeSi(CH_2CH_2(CF_2)_5CF_3)O]_6SiMe_3$ D: $Me_3SiO[MeSi(n-C_{18}H_{37})O]_{48}[MeSi(CH_2CH_2(CF_2)_5CF_3)O]_{12}SiMe_3$ The organopolysiloxanes of formula (II) which contain fluorine groups are solid at room temperature have a molecular weight of at least 1,000, preferably of 10,000 to 30,000.

The organopolysiloxanes of formula (II) which contain fluorine groups are solid at room temperature and have a waxy consistency and a melting point between 25° and 60° C.

The care compositions are prepared using organopolysiloxanes which are solid at room temperature and comprise units of formula (I) or organopolysiloxanes of formula (II) which are solid at room temperature, or mixtures thereof.

For the preparation of the care compositions the organopolysiloxane, which is solid at room temperature and contains fluorine groups, is used in amounts of 0.1% to 5.0% by weight, preferably 0.5% to 2.0% by weight, in each case based on the total weight of care composition according to the invention.

The organopolysiloxanes which are solid at room temperature are used in the form of an aqueous emulsion for the preparation of the care compositions according to the invention.

If an organopolysiloxane which contains fluorine groups, is solid at room temperature and comprises units of formula (I) is used for the preparation of the care compositions according to the invention, the emulsion is prepared by emulsifying the organopolysiloxane which is solid at room temperature, contains fluorine groups and comprises units of formula (I) in water using an emulsifier.

Emulsification of the organopolysiloxane which is solid at room temperature and contains fluorine groups can be carried out in customary mixing units suitable for the preparation of emulsions.

All the ionic and nonionic emulsifiers known to date, both individually and as mixtures of different emulsifiers, which have been used to prepare stable aqueous emulsions of organopolysiloxanes, can be used as emulsifiers in the preparation of the aqueous emulsions, used according to the invention, of organopolysiloxanes which are solid at room temperature and contain fluorine groups. Those emulsifying agents described in DE 36 13 384 C and in corresponding U.S. Pat. No. 4,757,106 (issued Jul. 12, 1988 to Wacker-Chemie GmbH) can also be used. Nonionic and cationic emulsifiers can also be used. Fatty alcohol polyglycol ethers, nonylphenolpolyglycol ethers, tri-n-butylphenolpoly-glycol ethers and quaternary ammonium salts of saturated and unsaturated fatty acids are preferably used.

The aqueous emulsions of organopolysiloxanes which are solid at room temperature and contain fluorine groups contain the emulsifier in amounts of 2% to 8% by weight, preferably 3% to 5% by weight, in each case based on the total weight of the organopolysiloxane used which is solid at room temperature.

The aqueous emulsions of organopolysiloxanes used which are solid at room temperature and contain fluorine groups have a solids content of preferably 10% to 60% by weight, in particular 15% to 42% by weight, in each case based on the total weight of the emulsion.

The temperature needed for the melting depends on the organopolysiloxane used and is between 20° and 60° C., preferably between 40° and 50° C.

The emulsification of the melt is carried out by processes customary in silicon chemistry.

The organopolysiloxanes according to the invention, which are solid at room temperature and contain fluorine groups, can also be dissolved in organic solvent and used as care compositions, optionally with the addition of suitable additives, which are listed below. Organic solvents are preferably petroleum benzines. Solutions having a content of 0.1% to 20% by weight, preferably 0.1% to 10% by weight, and more preferably 0.1% to 5% by weight, of solid organopolysiloxane containing fluorine groups are prepared.

Depending on the intended use, the care composition according to the invention can contain additives, such as waxes which do not contain silicon, thickeners, abrasives, preservatives and additives, and optionally, further silicones or emulsions thereof.

Examples of waxes which do not contain silicon are naturally occurring waxes of vegetable origin, such as carnauba wax and candelilla wax, montanic acid waxes and montan ester waxes, partly oxidized synthetic paraffins, polyethylene waxes, polyvinyl ether waxes and wax containing metal soaps, with carnauba wax, paraffin wax and polyethylene waxes being preferred and paraffin waxes being more preferred.

If waxes are used for the preparation of the care composition according to the invention, they are used in amounts of 0.1% to 5.0% by weight, preferably 0.1% to 1.0% by weight, in each case based on the total weight of the care composition.

Examples of thickeners are homopolysaccharides, heteropolysaccharides, polyacrylates, and carboxy- and hydroxymethylcellulose, polysaccharides and polyacrylates being preferred and polysaccharides being more preferred.

If thickeners are used for the preparation of the care composition according to the invention, they are used in amounts of 0.1% to 1.5% by weight, preferably 0.3% to 0.6% by weight, in each case based on the total weight of the care composition.

Examples of abrasives are polishing alumina, siliceous chalk, pyrogenic silicic acid and naturally occurring kieselgur, such as, "Snow Floss" from Lehmann & Foss, siliceous chalk and polishing alumina being preferred.

If abrasives are used for the preparation of the care composition according to the invention, they are used in amounts of 1% to 10% by weight, preferably 3% to 5% by weight, in each case based on the total weight of the care composition.

Examples of preservatives are formaldehyde, parabene, benzyl alcohol, salicylic acid and salts thereof, benzoic acid and salts thereof and isothiazolinones, formaldehyde and isothiazolinones being preferred and formaldehyde being more preferred.

If preservatives are used for the preparation of the care composition, they are used in amounts of 0.01% to 0.30% by weight, preferably 0.05% to 1.10% by weight, in each case based on the total weight of the care composition.

Examples of additives are fragrances and dyestuffs.

If additives are employed for the preparation of the care composition, they are used in amounts of 0.01% to 0.50% by weight, preferably 0.05% to 0.50% by weight, in each case based on the total weight of the care composition.

From each of the groups of substances mentioned above as possible components for the aqueous care compositions according to the invention, in each case one substance of this group or a mixture of at least two different such substances can be used as a component.

The care compositions according to the invention comprise water, in amounts of 85% to 99.9% by weight, preferably 93% to 99.5% by weight, in each case based on the total weight of the care composition, the water preferably being demineralized water.

The individual components of the care composition according to the invention can be mixed with one another in any desired manner. The additives can be admixed to the organopolysiloxane which is solid at room temperature before the emulsifying step. However, the additives can also be mixed with the finished emulsion of the organopolysiloxanes which are solid at room temperature and, optionally, of the organopolysiloxanes which are liquid at room temperature, which is preferred.

The emulsification or the mixing of the components which can be used for the preparation of the care compositions is carried out at a temperature of 20° to 50° C. under a pressure of the surrounding atmosphere of between 900 and 1100 hPa. Higher or lower temperatures and higher or lower pressures can also be used. The emulsifying step can be carried out in the customary mixing units which are suitable for the preparation of emulsions, such as high-speed stator/rotor stirred apparatuses according to Prof. P. Willems known by the registered trade name "Ultra-Turrax".

The care compositions according to the invention have a consistency ranging from thinly liquid to creamily pastelike at room temperature.

The care compositions according to the invention have a good emulsion stability of at least two years if stored correctly at room temperature.

The present invention also relates to a method for care treatment of hard surfaces, which comprises applying the care composition according to the invention to the hard surface.

In the method according to the invention, the care composition is applied by spraying, dipping or using an aid, such as wadding, textiles and sponge, and rubbed on. The care composition has the advantage that it can be easily applied and readily rubbed on.

The hard surfaces to be treated are, metallic surfaces, painted surfaces and surfaces of plastics. The care composition is outstandingly suitable for treatment of automobile bodies.

The care compositions according to the invention have the advantage that they contain no organic solvent or comprise organic solvent only in extremely small amounts, for example as a preservative. They also have the advantage that they provide an excellent resistance to weathering and washing. To achieve this effect, only small amounts of the organopolysiloxanes which are solid at room temperature for the preparation of the care compositions are required.

The care compositions additionally have the advantage that they have an excellent resistance to oils, fats and solvents. This is particularly important in the case of surfaces which are exposed to severe contamination by oily carbon black, for example by combustion engines, or direct contact with solvents, for example at the fuel tank filler opening of motor vehicles.

The care compositions have the advantage that they are non-flammable (if they are based on water), are easy to use and impart a good depth of color and high gloss to the solid surfaces treated.

In the examples described below, all the data on parts and percentages relate to the weight, unless stated otherwise. Furthermore, all the viscosity data relate to a temperature of 25° C. Unless stated otherwise, the examples below were carried out under a pressure of the surrounding atmosphere of about 1,000 hPa, and at room temperature at about 20° C., or at a temperature which is established when the reactants are brought together at room temperature without additional heating or cooling.

The wetting angle measurements were made as follows: a drop of water having a volume of 0.01 ml is applied from a height of 15 mm to the surface to be tested and the wetting angle is determined with the aid of a goniometer (Model 100-10 from Rame-Hart Inc., New Jersey, USA). The measurement is repeated a total of 5 times and the mean of the 5 measurements is obtained. The wetting angle measurement on the substrate which has not been treated with the care composition according to the invention is called the blank value in the following.

The following abbreviations are used:
Me: methyl radical
Et: ethyl radical.
Waxes used:
A: $Me_3SiO[MeSi(n-C_{18}H_{37})O]_{60}-SiMe_3$
B: $Me_3SiO[MeSi(n-C_{18}H_{37})O]_{57}[MeSi(CH_2CH_2(CF_2)_5CF_3)O]_3SiMe_3$
C: $Me_3SiO[MeSi(n-C_{18}H_{37})O]_{54}[MeSi(CH_2CH_2(CF_2)_5CF_3)O]_6SiMe_3$
D: $Me_3SiO[MeSi(n-C_{18}H_{37})O]_{48}[MeSi(CH_2CH_2(CF_2)_5CF_3)O]_{12}SiMe_3$

EXAMPLE 1

Benzine formulation

Testing of the hydrophobization:

Waxes A-D are dissolved in petroleum spirit 100/140° (commercially obtainable from Merck) in an amount of 2% strength and the solution is applied with wadding to painted sheet metal of a motor vehicle body with a contact angle of 66° with respect to water, and rubbed in. After standing at room temperature for 15 minutes, the wetting angles of the treated surfaces with respect to water are measured and the substrates are then sprinkled at room temperature four times for 15 minutes with in each case 10 liters per 100 cm² of surface with tap water having a temperature of about 6° C. from a distance of 20 cm. The result of the wetting angle measurements is found in Table 1.

TABLE 1

| Sprinkling duration [min] | Wax A (wetting angle) | Wax B (wetting angle) | Wax C (wetting angle) | Wax D (wetting angle) |
|---|---|---|---|---|
| 0 | 101 | 102 | 104 | 105 |
| 15 | 102 | 102 | 105 | 106 |
| 30 | 100 | 100 | 104 | 106 |
| 45 | 98 | 98 | 102 | 106 |
| 60 | 97 | 98 | 102 | 105 |

Testing of the oleophobization:

Waxes A-D are dissolved in petroleum spirit 100/140° (commercially obtainable from Merck) to the extent of 2% strength and the solution is applied with wadding to painted sheet metal of a motor vehicle body with a contact angle of 20° with respect to paraffin oil, and rubbed in. After standing for 15 minutes at room temperature, the wetting angles of the treated surfaces with respect to paraffin oil are measured. The results are listed in Table 2:

TABLE 2

| Wax A (wetting angle) | Wax B (wetting angle) | Wax C (wetting angle) | Wax D (wetting angle) |
|---|---|---|---|
| 45 | 51 | 53 | 48 |

Wax C shows the best compromise between substrate adhesion and hydrophobization and oleophobization.

EXAMPLE 2

Aqueous formulation

Ready-to-use formulations 0.3 g of polyacrylic acid (commercially obtainable under the name Carbopol from Goodrich, Neuss) is dispersed in 96.4 g of deionized water, while stirring, and 2.0 g of the emulsion described under A, 1.0 g of the emulsion described under B, 0.2 g of triethanolamine and 0.1 g of formalin solution (40% strength) are then added.

The hydrophobizing and oleophobizing composition thus obtained is applied with wadding to the sheet metal of a motor vehicle body with a contact angle of 66° with respect to water and a contact angle of 20° with respect to paraffin oil, and is rubbed on. After standing for 15 minutes at room temperature, the wetting angles with respect to water and paraffin oil are measured and the sheet metal is then sprinkled at room temperature four times for 15 minutes with in each case 10 liter per 100 cm² of surface with tap water having a temperature of about 6° C. from a distance of 20 cm. The result of the wetting angle measurements with respect to water and paraffin off are to be found in Table 3.

A) 25 g of a fatty alcohol polyglycol ether emulsifier (commercially obtainable under the name "Genapol" from Hoechst AG) are added to 175 g of organopolysiloxane of the formula $Me_3SiO[MeSi(n-C_{18}H_{37})O]_{54}[MeSi(CH_2CH_2)(CF_2)-_5CF_3)O]_6SiMe_3$ and the mixture is stirred. This mixture is then emulsified with the aid of an emulsifying apparatus by adding 300 g of deionized water, while stirring constantly. An aqueous emulsion of a fluorine-containing organopolysiloxane which is solid at room temperature is obtained with a solids content of 38% by weight, based on the total weight of emulsion.

B) 15 g of a fatty alcohol polyglycolether emulsifier (commercially obtainable under the name "Genapol", from Hoechst AG) are added to 175 g of dimethylpolysiloxane terminated with trimethylsiloxy units and having a viscosity of 350 mm²/s (commercially obtainable under the name "AK 350", from Wacker Chemie GmbH, Munich), and the mixture is stirred. This mixture is then emulsified with the aid of an emulsifying apparatus by adding 310 g of deionized water, while stirring constantly. An aqueous emulsion of dimethyl-polysiloxane which is liquid at room temperature is obtained with a solids content of 37% by weight, based on the total weight of emulsion.

TABLE 3

| Duration of sprinkling [min] | Wetting angle with respect to water | Wetting angle with respect to paraffin oil |
|---|---|---|
| 0 | 106 | 35 |
| 15 | 102 | 51* |
| 30 | 102 | 51* |
| 45 | 101 | 52* |
| 60 | 100 | 52* |

*Components which are liquid at room temperature, such as the dimethylpolysiloxane used in B, show a good compatibility with paraffin, so that the oleophobic action of the formulation claimed applies fully only if theses components which are liquid at room temperature are washed out.

What is claimed is:

1. A composition for the care of hard surfaces, prepared from an aqueous emulsion, comprising a fluorine group confining organopolysiloxane which is solid at room temperature and has a melting point of from 25° C. to 60° C. and an emulsifier.

2. The composition as claimed in claim 1 in which the fluorine group containing organopolysiloxane which is solid at room temperature is comprised of units of formula $$R_aR^1_bSiO_{(4-a-b)/2} \quad (I)$$

in which

R is an identical or different monovalent hydrocarbon radical or hydrocarbon radical containing fluorine groups, $R^1$ is an identical or different hydrocarbon radical containing fluorine groups, a is 0, 1, 2 or 3, and b is 0, 1, 2 or 3, with the proviso that the sum of a+b is less than or equal to 3 and at least one unit which contains a hydrocarbon radical containing fluorine groups is present in the organopolysiloxane comprised of units of formula (I).

3. The composition as claimed in claim 1, wherein the organopolysiloxane is a linear organopolysiloxane which is solid at room temperature, comprised of units of formula

$$R_3SiO(SiR_2O)_r[(SiRR^1O)_x(SiRR^2O)_s]_ySiR_3 \qquad (II),$$

in which $R^2$ is an identical or different monovalent hydrocarbon radical, and

R is an identical or different monovalent hydrocarbon radical or hydrocarbon radical containing fluorine groups, $R^1$ is an identical or different hydrocarbon radical containing fluorine groups, r has a value from 0 to 100, s has a value from 0 to 179, x has a value from 0 to 300, y has a value from 1 to 180, and the sum of x+y is 1–300, with the proviso that at least one radical R in formula (II) is a hydrocarbon radical having at least 18 carbon atoms, and where r=0 at least one radical R has the meaning of $R^1$.

4. The composition as claimed in claim 1, where the organopolysiloxane is present in amounts of 0.1% to 5.0% by weight, based on the total weight of the care composition.

5. The composition as claimed in claim 1 which comprises water in mounts of 85% to 99.9% by weight, based on the total weight of the composition.

6. The composition as claimed in claim 5, is free of organic solvent.

7. A process for the care of a hard surface, comprising applying the composition as claimed in claim 1 to the hard surface.

8. The process as claimed in claim 7, wherein the hard surfaces are those chosen from the group consisting of a metallic surface, a painted surface and a surface of plastic.

9. The composition as claimed in claim 1, further comprising;

A. waxes that are free of silicone,

B. thickeners

C. abrasives,

D. preservatives,

E. additives selected from the group consisting of fragrances and colorants, or

F. mixtures of A, B, C, D or E.

10. The composition as claimed in claim 1, further comprising silicones that are liquid at room temperature.

11. A composition for the care of hard surfaces, prepared from a solution of a fluorine group containing organopolysiloxane, which is solid at room temperature, has a melting point of from 25° C. to 60° C., dissolved in an organic solvent.

12. A process for the care of a hard surface, comprising; applying the composition as claimed in claim 11 to the hard surface.

13. The process as claimed in claim 12, where the hard surface is selected from the group consisting of a metallic surface, a painted surface, and a surface of plastic.

* * * * *